United States Patent
Pearl et al.

(10) Patent No.: US 9,795,921 B2
(45) Date of Patent: Oct. 24, 2017

(54) FLUID TREATMENT ASSEMBLIES, MANIFOLDS FOR FLUID TREATMENT ASSEMBLIES, AND METHODS FOR TREATING FLUIDS

(75) Inventors: Steven Pearl, Hollis, NH (US); Cheryl Sayer, Lowell, MA (US); Sylvia Messier, Stow, MA (US)

(73) Assignee: PALL CORPORATION, Port Washington, NY (US)

( * ) Notice: Subject to any disclaimer, the term of this patent is extended or adjusted under 35 U.S.C. 154(b) by 38 days.

(21) Appl. No.: 13/570,741

(22) Filed: Aug. 9, 2012

(65) Prior Publication Data

US 2013/0037486 A1 Feb. 14, 2013

Related U.S. Application Data

(60) Provisional application No. 61/522,708, filed on Aug. 12, 2011.

(51) Int. Cl.
*B01D 63/00* (2006.01)
*B01D 63/08* (2006.01)
(Continued)

(52) U.S. Cl.
CPC ......... *B01D 61/00* (2013.01); *B01D 63/082* (2013.01); *B01D 2311/14* (2013.01);
(Continued)

(58) Field of Classification Search
CPC .... B01D 63/08; B01D 63/082; B01D 63/084; B01D 63/087; B01D 63/088; B01D 2311/08; B01D 2311/14; B01D 2311/16; B01D 2313/06; B01D 2313/24; B01D 2313/125; B01D 2313/19;
(Continued)

(56) References Cited

U.S. PATENT DOCUMENTS 4,261,834 A 4/1981 deWinter
4,846,970 A 7/1989 Bertelsen et al.
(Continued)

FOREIGN PATENT DOCUMENTS

| CN | 1530331 A | 9/2004 |
|----|-----------|--------|
| EP | 1 946 825 A1 | 7/2008 |
| GB | 2 360 958 A | 10/2001 |
| JP | 06-047212 A | 2/1994 |
| JP | 10-500613 A | 1/1998 |
| JP | 2002-525196 A | 8/2002 |
| JP | 2002-536160 A | 10/2002 |
| JP | 2004-276020 A | 10/2004 |
| KR | 20-0365882 Y1 | 10/2004 |
| WO | WO 95/26801 A1 | 10/1995 |
| WO | WO 00/47307 A1 | 8/2000 |

OTHER PUBLICATIONS

Korean Application No. 2013-7010269 Office Action, dated Oct. 31, 2014.

*Primary Examiner* — Pranav Patel
(74) *Attorney, Agent, or Firm* — Leydig Voit & Mayer

(57) ABSTRACT

A fluid treatment assembly comprises one or more cross flow fluid treatment units positioned between opposite end pieces. The fluid treatment unit includes a permeable fluid treatment medium having a feed side and a permeate side. The fluid treatment assembly further comprises a feed inlet and feed passage, a permeate outlet and a permeate passage, and a retentate outlet and a retentate passage. The feed passage directs feed fluid from the feed inlet to the permeable medium and tangentially along the feed side of the permeable medium. The permeate passage directs permeate from the permeate side of the permeable medium to the permeate outlet. The retentate passage directs retentate from the feed side of the permeable medium to the retentate outlet. A flow restrictor is positioned in the retentate passage.

8 Claims, 6 Drawing Sheets

(51) Int. Cl.
 *B01D 61/00*  (2006.01)
 *B01D 61/22*  (2006.01)
(52) U.S. Cl.
 CPC .... *B01D 2313/083* (2013.01); *B01D 2313/19* (2013.01); *B01D 2315/10* (2013.01)
(58) Field of Classification Search
 CPC .......... B01D 2313/083; B01D 2315/10; C02F 2209/003; C02F 2209/03; C02F 2209/40
 USPC .......... 210/224–231, 321.6, 321.72, 321.73, 210/321.75, 321.84
 See application file for complete search history.

(56) References Cited

U.S. PATENT DOCUMENTS

| | | |
|---|---|---|
| 4,849,102 A | 7/1989 | Latour et al. |
| 6,183,647 B1 | 2/2001 | Aalto et al. |
| 6,312,591 B1 | 11/2001 | Vassarotti et al. |
| 7,364,653 B1 | 4/2008 | Slegers |
| 7,682,511 B2 | 3/2010 | de los Reyes et al. |
| 2003/0111402 A1 | 6/2003 | Baig et al. |
| 2004/0068219 A1 | 4/2004 | Summerton et al. |
| 2004/0178146 A1 | 9/2004 | Gaignet |
| 2005/0029192 A1 | 2/2005 | Arnold et al. |
| 2005/0173319 A1 | 8/2005 | Fritze et al. |
| 2007/0138082 A1 | 6/2007 | Connors, Jr. et al. |
| 2007/0240492 A1 | 10/2007 | DiLeo et al. |
| 2008/0135468 A1 | 6/2008 | Gagnon et al. |
| 2008/0135500 A1 | 6/2008 | Gagnon et al. |
| 2008/0251444 A1 | 10/2008 | Fendya et al. |
| 2009/0277833 A1 | 11/2009 | Mir et al. |

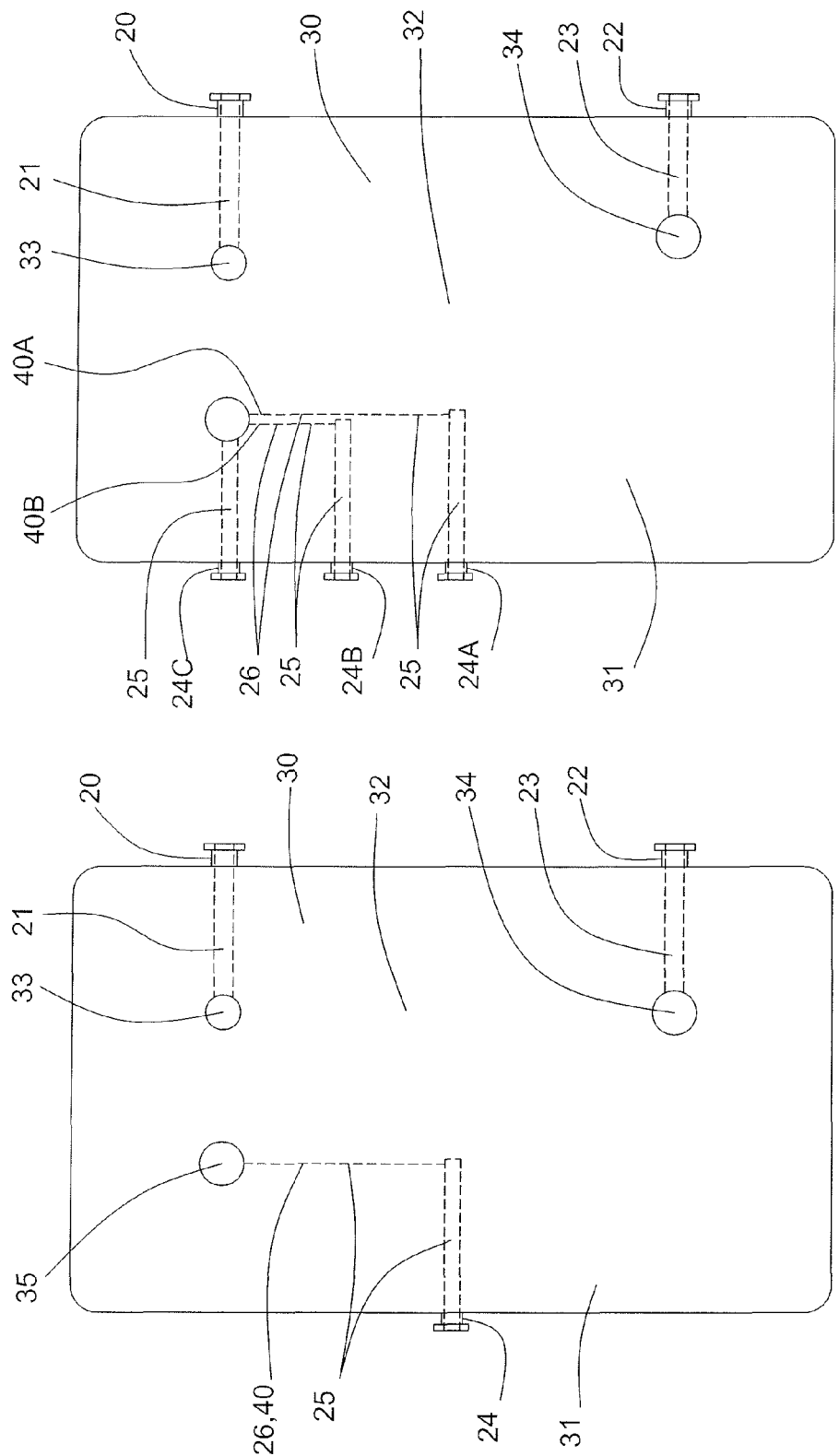

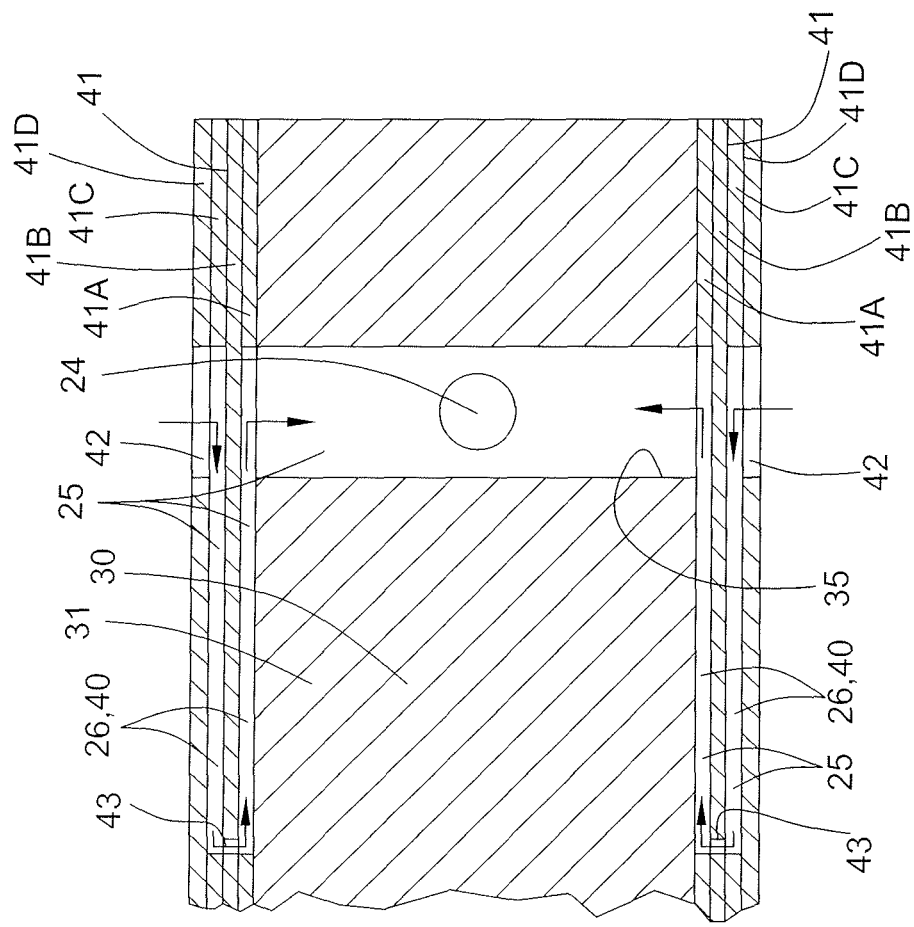
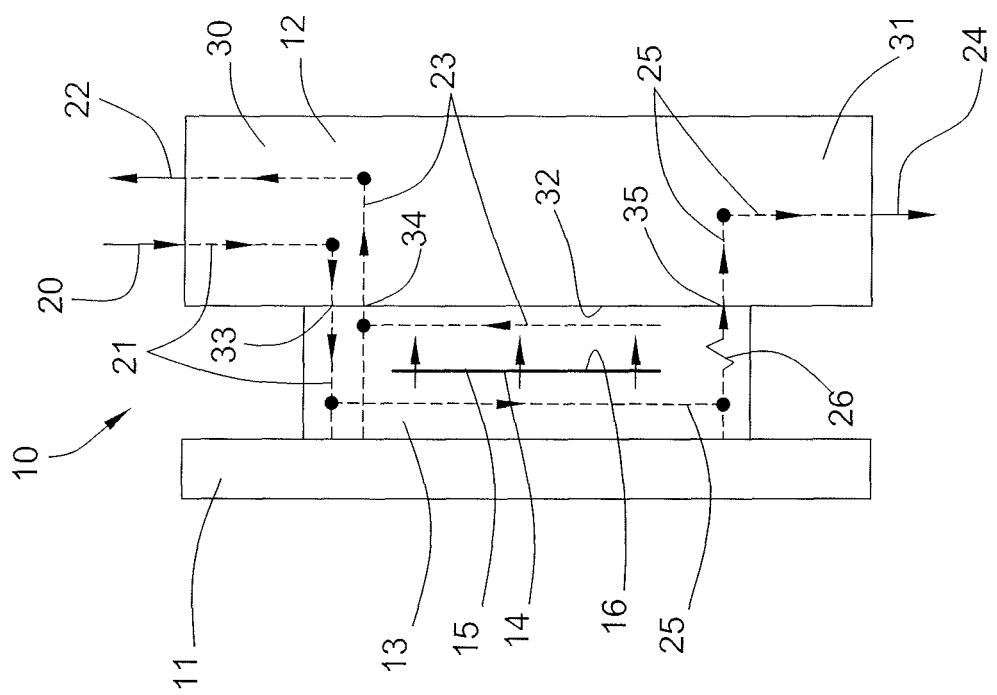
FIG. 4
FIG. 10

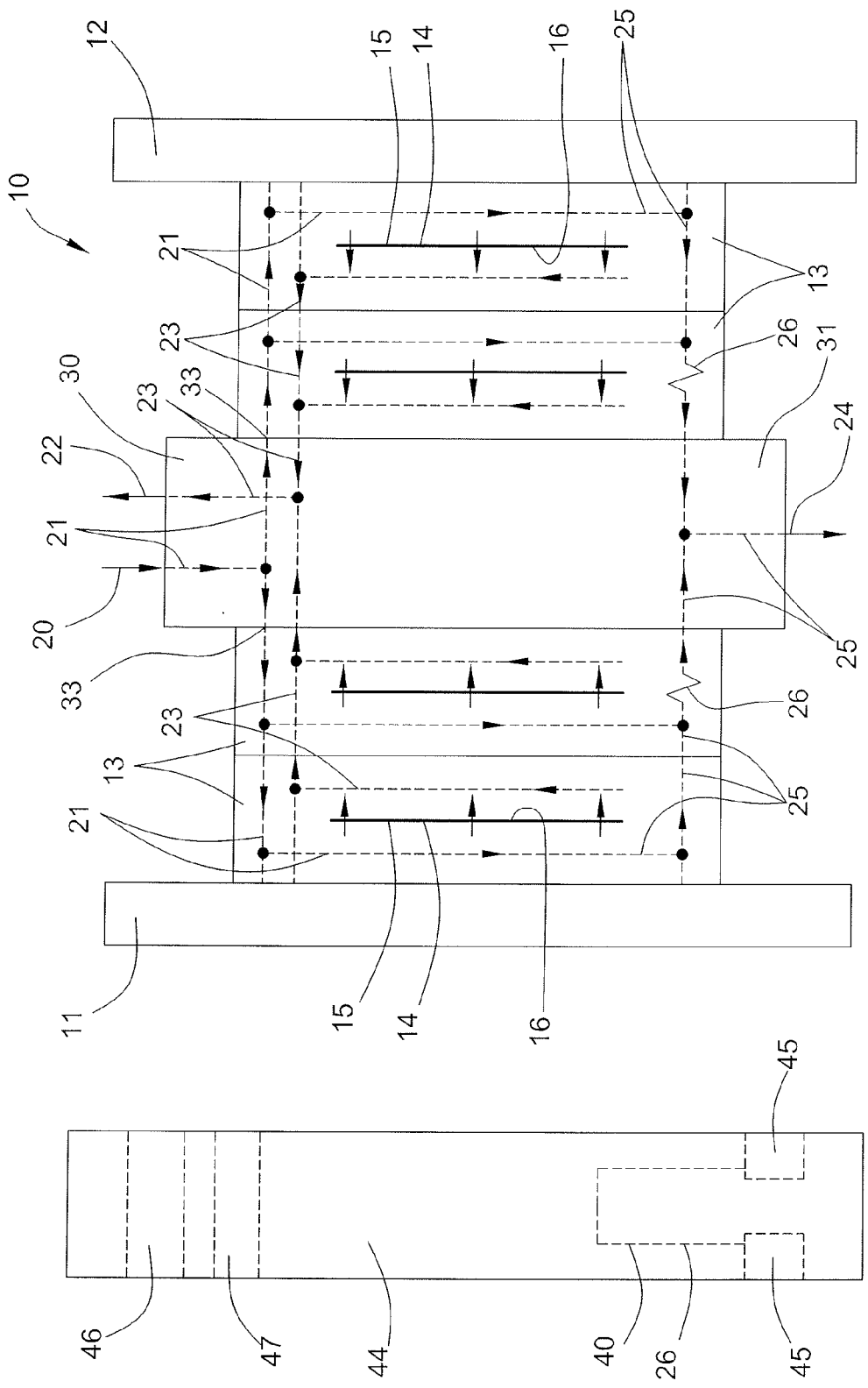

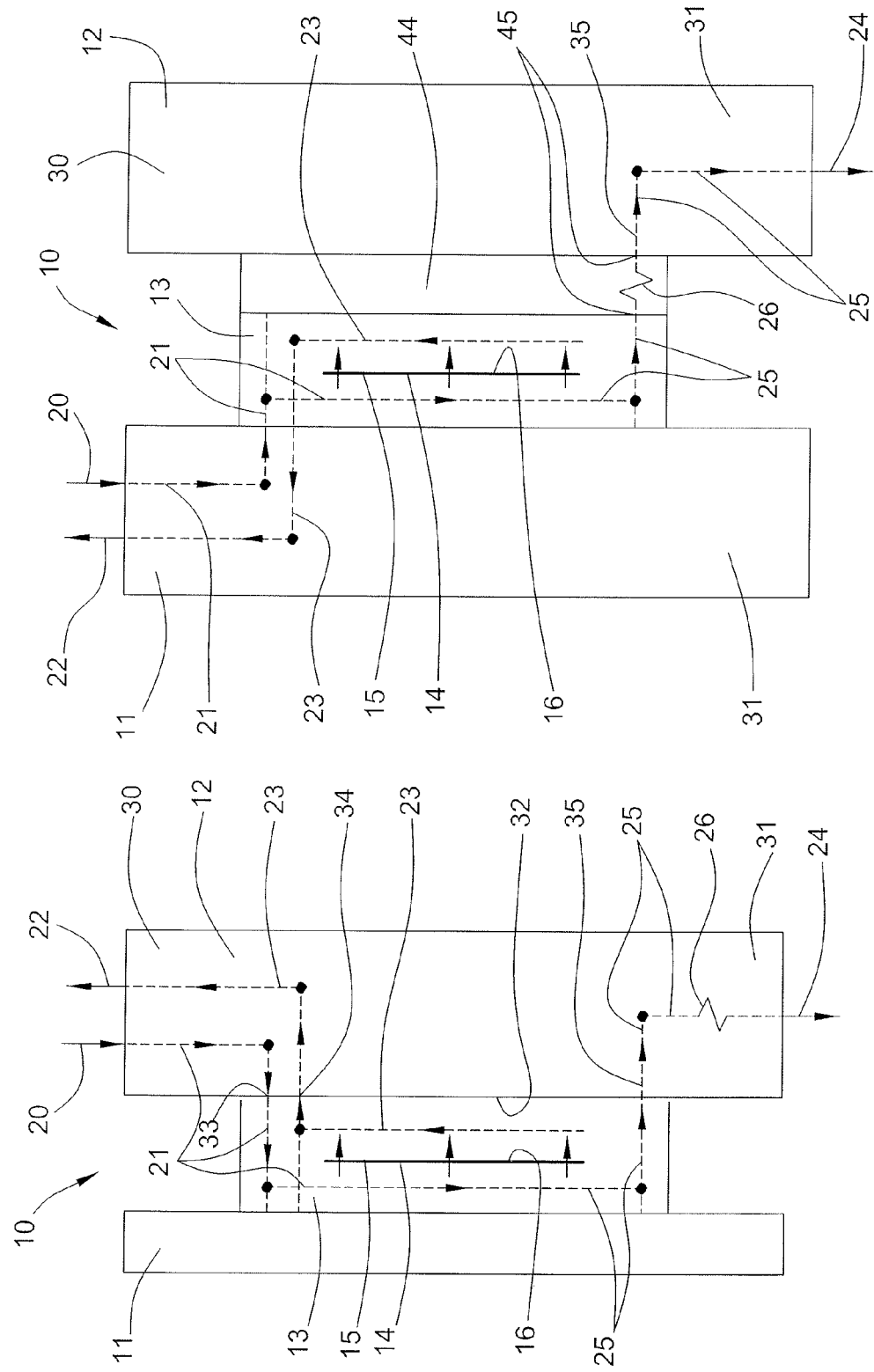

ard in the retentate passage. Directing the retentate
FLUID TREATMENT ASSEMBLIES, MANIFOLDS FOR FLUID TREATMENT ASSEMBLIES, AND METHODS FOR TREATING FLUIDS

FIELD OF THE INVENTION

The invention relates to fluid treatment assemblies, manifolds for fluid treatment assemblies, and methods for treating fluids that may be used to treat a wide variety of fluids in any of numerous ways in single- or multi-use applications. Each fluid treatment assembly embodying the invention may include one or more cross flow fluid treatment units positioned between opposite end pieces. Each fluid treatment unit may include a permeable fluid treatment medium having a feed side and a permeate side. The fluid to be treated is known as feed or process fluid. The fluid treatment assembly may include a feed fluid inlet and a feed passage that directs the feed fluid from the feed fluid inlet to and tangentially along the feed side of the permeable fluid treatment medium. The fluid which passes from the feed side through the permeable medium to the permeate side is known as permeate or filtrate. The fluid treatment assembly may also include a permeate outlet and a permeate passage which directs permeate from the permeate side of the fluid treatment medium to the permeate outlet. The fluid that does not pass through the fluid treatment medium is known as retentate or concentrate. The fluid treatment assembly may further include a retentate outlet and a retentate passage that directs retentate from the feed side of the fluid treatment medium to the retentate outlet. Additionally, the fluid treatment assembly may include one or more manifolds, and the fluid inlet, the permeate outlet, and the retentate outlet may be located on the manifold(s). The manifold with the feed inlet may distribute feed fluid from the feed inlet to each fluid treatment unit via the feed passage. The manifold with the permeate outlet may channel permeate from each fluid treatment unit to the permeate outlet via the permeate passage. The manifold with the retentate outlet may channel retentate from each fluid treatment unit to the retentate outlet via the retentate passage.

In use, feed fluid may be supplied under pressure to the feed inlet of the fluid treatment assembly. The fluid pressure forces the feed fluid along the feed passage to the permeable fluid treatment medium of each fluid treatment unit and then tangentially along the feed side of the permeable medium. The fluid pressure on the feed side is higher than the fluid pressure on the permeate side of the permeable medium. This difference in pressure, or differential pressure, forces a portion of the feed fluid from the feed side through the permeable medium to the permeate side as permeate or filtrate. From the permeate side, the permeate is forced by the fluid pressure along the permeate passage to the permeate outlet. The remainder of the feed fluid that does not pass through the permeable medium, i.e., the retentate or concentrate, is forced by the fluid pressure along the retentate passage to the retentate outlet. Either the permeate, the retentate, or both may be the desired product.

SUMMARY OF THE INVENTION

In accordance with one aspect of the invention, fluid treatment assemblies may comprise first and second opposite end pieces and at least one fluid treatment unit positioned between the first and second end pieces. The fluid treatment unit may include a permeable fluid treatment medium which has a feed side and a permeate side. Each fluid treatment assembly may also comprise a feed inlet and a feed passage which extends from the feed inlet through the fluid treatment unit to the feed side of the fluid treatment medium, a permeate outlet and a permeate passage which extends from the permeate side of the fluid treatment medium to the permeate outlet, and a retentate outlet and a retentate passage which extends from the feed side of the fluid treatment medium to the retentate outlet. Each fluid treatment assembly may further include a flow resistor positioned in the retentate passage to increase the back pressure in the retentate passage.

In accordance with another aspect of the invention, methods for treating a fluid in a fluid treatment assembly having a feed inlet, a permeate outlet, and a retentate outlet may comprise supplying a feed fluid under pressure from the feed inlet through a feed passage in the fluid treatment assembly and tangentially along a feed side of a permeable fluid treatment medium. Each method may also comprise directing permeate from the permeate side of the permeable fluid treatment medium through a permeate passage in the fluid treatment assembly to the permeate outlet and directing retentate from the feed side of the permeable fluid treatment medium through a retentate passage in the fluid treatment assembly to the retentate outlet. Directing the retentate through the retentate passage may include passing the retentate through a flow restrictor in the retentate passage to increase the back pressure in the retentate passage.

In accordance with a further aspect of the invention, manifolds for a fluid treatment assembly having at least one cross flow fluid treatment unit may comprise a body, a retentate outlet, a retentate passage, and a flow restrictor. The body may have a retentate opening for receiving retentate from a fluid treatment assembly. The retentate outlet may be on the body, and the retentate passage may extend through the body from the retentate opening to the retentate outlet. The flow restrictor may be positioned in the retentate passage and configured to increase the resistance to retentate flow through the retentate passage.

Fluid treatment assemblies, manifolds, and methods which embody the invention have many advantages. For example, positioning a flow restrictor in the retentate fluid passage of the fluid treatment assembly increases the back pressure, i.e., the resistance to fluid flow, in the retentate passage, which may increase the pressure at the feed side of the permeable fluid treatment media of the fluid treatment units. Increasing the feed side pressure increases the differential pressure across the permeable media and forces a larger portion of the feed fluid from the feed side through the permeable medium as permeate. If the permeate is the desired product, a larger volume of the desired permeate is available at the permeate outlet. If the retentate is the desired product, the larger volume of permeate forced through the permeable medium eliminates more of the less desired permeate and further concentrates the more desired retentate available at the retentate outlet. Further, providing a flow restrictor in the retentate passage significantly facilitates the installation and use of the fluid treatment assembly in a fluid system. Because the fluid treatment assembly includes a flow restrictor in the retentate passage, the fluid system may include less exterior valving that needs to be connected to the retentate outlet and adjusted to control retentate flow from the retentate outlet. The fluid treatment assembly may instead be quickly and easily installed and used by simply connecting the feed inlet and the permeate and retentate outlets of the fluid treatment assembly to the appropriate ports of the fluid system and supplying feed fluid under pressure to the feed inlet of the fluid treatment assembly. For many but not all embodiments of the invention, providing the flow restrictor in the retentate passage in a manifold is especially effective and convenient.

Further features and advantages of some of the embodiments of the invention are further disclosed in the following description and the accompanying drawings.

BRIEF DESCRIPTION OF THE DRAWINGS

FIG. 2 is a plan view of a manifold of the fluid treatment assembly of FIG. 1.

FIG. 3 is a plan view of another manifold.

FIG. 4 is a cross sectional view of a portion of another manifold.

FIG. 6 is a side view of a restrictor piece.

FIG. 7 is a representative view of another fluid treatment assembly.

FIG. 8 is a representative view of another fluid treatment assembly.

FIG. 9 is a representative view of another fluid treatment assembly.

FIG. 10 is a representative view of another fluid treatment assembly.

DESCRIPTION OF EMBODIMENTS OF THE INVENTION

Figure 1:
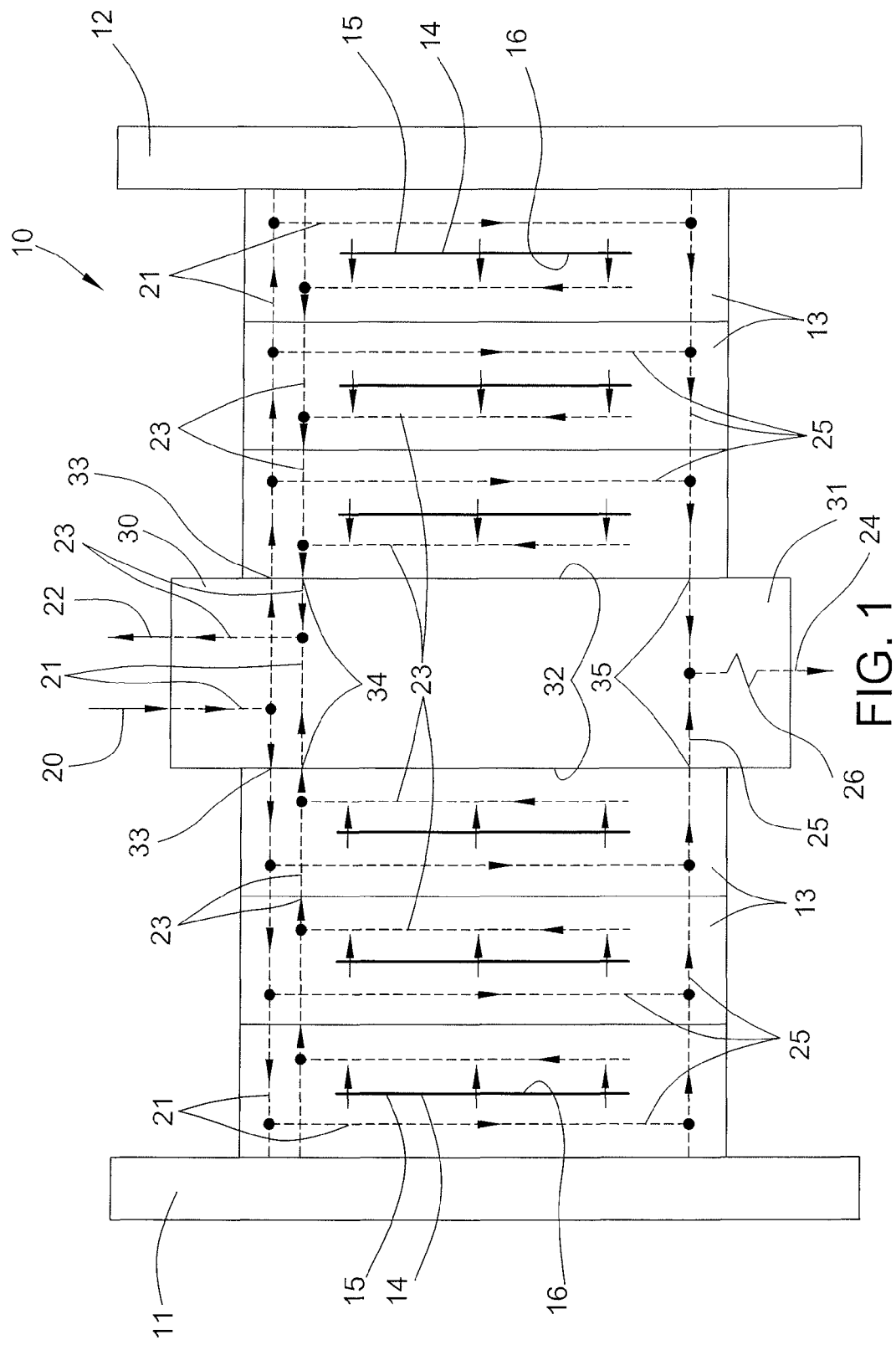
FIG. 1 is a representative view of a fluid treatment assembly.

Fluid treatment assemblies embodying one or more aspects of the invention may be configured in a wide variety of ways. One of many different examples of a fluid treatment assembly 10 is shown in FIG. 1. Generally, the fluid treatment assembly 10 may comprise a multilayer structure including opposite end pieces 11, 12 and one or more cross flow fluid treatment units 13 positioned between the end pieces 11, 12. Each fluid treatment unit 13 may include a permeable fluid treatment medium 14 having a feed side 15 and an opposite permeate side 16. The fluid treatment assembly 10 may also include at least one feed inlet 20 and a feed passage 21 for directing feed fluid from the feed inlet 20 to the feed side 15 of at least one permeable medium 14, at least one permeate outlet 22 and a permeate passage 23 tier directing permeate from the permeate side 16 of each permeable medium 14 to the permeate outlet 22, and at least one retentate outlet 24 and a retentate passage 25 for directing retentate from the feed side 15 of at least one permeable medium 14 to the retentate outlet 24. The fluid treatment assembly 10 further includes a flow restrictor 26 positioned at any of a variety of locations in the retentate passage 25 to increase the back pressure, i.e., the resistance to fluid flow, within the retentate passage 25.

Each cross flow fluid treatment unit 14 may be configured in any of numerous ways and the shape and size of each fluid treatment unit 14 may vary from one fluid treatment assembly to another. For example, each fluid treatment unit may comprise one or more layers of permeable fluid treatment media sealed within a casing to define the feed side and the permeate side of the permeable medium. One or more feed channels, permeate channels, and retentate channels may extend within the casing to supply feed fluid to the feed side of the permeable medium, to receive permeate from the permeate side of the permeable medium, and to receive retentate from the feed side of the permeable medium. The feed channels may form a portion of the feed passage 21, the permeate channels may form a portion of the permeate passage 23, and the retentate channels may form a portion of the retentate passage 25.

Alternatively, the cross flow fluid treatment unit may comprise at least one feed layer, at least one permeate layer, and at least one layer of a permeable fluid treatment medium. The feed layer and the permeate layer may each comprise a porous sheet, e.g., a woven or nonwoven fibrous sheet or a sheet of metallic or polymeric mesh, and the permeable medium layer may be positioned between the feed and permeate layers. The arrangement of the feed layer(s), the medium layer(s), and the permeate layer(s) may be encased, e.g., encapsulated by a thermoplastic or thermosetting resin, and provided with feed, permeate, and retentate openings, e.g., throughholes. The feed opening may fluidly communicate with the porous feed layer, forming a portion of the feed passage 21; the retentate opening may also fluidly communicate with the porous feed layer, forming a portion of the retentate passage 25; and the permeate opening may fluidly communicate with the porous permeate layer, forming a portion of the permeate passage 23. An example of a fluid treatment unit is disclosed, for example, in U.S. Provisional Patent Application No. 61/476,874 filed on Apr. 19, 2011 and entitled Fluid Treatment Arrangements and Methods of Making Fluid Treatment Arrangements.

The fluid treatment medium may be permeable, i.e., porous, permeable, semipermeable, or permselective, and may be formed from any of numerous materials, including, for example, a natural or synthetic polymer. The fluid treatment medium may be fashioned as any of a wide variety of structures, including, for example, a fibrous or filamentous structure, such as a woven or non-woven sheet, or a membrane, such as a supported or unsupported membrane. Further, the fluid treatment medium may have, or may be modified to have, any of a myriad of fluid treatment characteristics. For example, the fluid treatment medium may have a positive, negative, or neutral electrical charge; it may be liquiphobic or liquiphilic, including hydrophobic or hydrophilic or oleophobic or oleophilic; and/or it may have attached functional groups, such as ligands or any other reactive moiety, that can chemically bind to substances in the fluid. The fluid treatment medium may be formed from, impregnated with, or otherwise contain a variety of materials that function to further treat the fluid in any of numerous ways. These functional materials may include, for example, sorbents, ion exchange resins, chromatography media, enzymes, reactants, or catalysts of all types that may chemically and/or physically bind, react with, catalyze, deliver, or otherwise affect substances in the fluid or the fluid itself. Further, the fluid treatment medium may have any of a wide range of molecular cutoffs or removal ratings, for example, from ultraporous or nanoporous or finer to microporous or coarser. The fluid treatment medium may thus function as a treatment medium of any type, including a capture medium or a separation medium such as a filtration medium.

The end pieces 11, 12 may also be configured in many different ways. For example, each end piece 11, 12 may be a blind end plate having no fluid openings or fluid passages. Each blind end plate 11, 12 may, for example, have a generally box-like shape and may include a mounting surface which faces the fluid treatment units 13. One or more fluid treatment units 13 may be stacked next to one another between the mounting surfaces of the blind end plates 11, 12. The feed, permeate, and/or retentate passages 21, 23, 25 of one fluid treatment unit 13 may be aligned and sealed to the feed, permeate, and/or retentate passages 21, 23, 25 of an adjacent fluid treatment unit 13. The blind end plates 11, 12 may seal and close off the feed, permeate, and/or retentate passages 21, 23, 25 in the adjacent fluid treatment unit 13 contacting the mounting surface of each blind end plate 11, 12.

The fluid treatment assembly 10 may further comprise at least one manifold 30 as a component of the multilayer structure. One or more manifolds 30 may be positioned between the end pieces 11, 12, for example, in the stack of fluid treatment units 13 between the blind end plates. The manifold may be variously configured. For example, the manifold may include at least one or more fluid passages and one or more fluid inlets for receiving fluid from the fluid system or one or more fluid outlets for discharging fluid to the fluid system. In the embodiment shown in FIGS. 1 and 2, the manifold 30 may include a body 31 having a mounting surface 32 facing the fluid treatment units 13 on one side or on each opposite side of the manifold 30. Feed, permeate, and/or retentate openings 33, 34, 35 in the body 31 of the manifold 30, e.g., in the mounting surface 32, allow one or more of the feed, permeate, and/or retentate passages 21, 23, 25 to extend from the fluid treatment units 13 through the manifold to a feed inlet 20, a permeate outlet 22, and/or retentate outlet 24 on the body 31 of the manifold 30. Each inlet and/or outlet may be configured as a fitting for connecting the inlet and/or outlet to a fluid system (not shown) and may include a mechanism for opening and closing the inlet/outlet. The fluid system may supply feed fluid to the fluid treatment assembly 10 and/or receive permeate or retentate from the fluid treatment assembly 10. For example, the retentate passage 25 may extend from the fluid treatment units 13 through the body 31 of the manifold 30 to the retentate outlet 24. For some embodiments, the feed passage 21 may extend from the feed inlet 20 through the manifold 30 to the fluid treatment units 13 and/or the permeate passage 23 may extend from the fluid treatment units 13 through the manifold 30 to the permeate outlet 22. In other embodiments, the feed inlet and the feed passage and/or permeate outlet and the permeate passage may be associated with another manifold of the fluid treatment assembly. Examples of a manifold are disclosed, for example, in United States Patent Application Publication No. US 2008/0132200 A1 entitled Filtration Assemblies, Filtration Manifolds, Filtration Units, and Methods for Channeling Permeate and in U.S. patent application Ser. No. 12/954,118 filed on Nov. 24, 2010 and entitled Manifold Plates and Fluid Treatment Arrangements Including Manifold Plates.

The fluid treatment units 13 and the manifold 30 may be mounted between the end pieces 11, 12 in any of numerous ways. For example, the manifold 30 may be positioned between the end pieces 11, 12 with a first set of one or more fluid treatment units 13 between the mounting surface of one end piece 11 and the mounting surface 32 on one side of the manifold 30 and with a second set of one or more fluid treatment units 13 between the mounting surface of the other end piece 12 and the mounting surface 32 on the opposite side of the manifold 30. Alternatively, the manifold may be positioned between the end pieces adjacent to one of the end pieces with a set of one or more fluid treatment units between the mounting surfaces of the manifold and the other end piece. The fluid treatment units 13 of each set of two or more units may be arranged to fluidly communicate with one another via the feed, permeate and retentate passages 21, 23, 25 in a variety of ways, including a serial, parallel, or combined serial/parallel manner. For some embodiments, many or all of the fluid treatment units 13 may be arranged in parallel along at least the retentate passage 25. The fluid treatment units 13 may be bonded to one another and/or the manifold 30 or the end pieces 11, 12, for example, as disclosed in U.S. Provisional Application No. 61/476,874. Alternatively or additionally, the fluid treatment units may be pressed against one another along with the manifold and end pieces.

The fluid treatment assembly may include one or more additional components. For example, the fluid treatment assembly may include one or more alignment rods for maintaining the fluid treatment units, the manifold, and/or the end pieces properly aligned with their fluid passages and openings appropriately communicating with one another. The fluid treatment assembly may also include one or more compression rods for compressing the fluid treatment units and the manifold between the end pieces. Examples of alignment rods and compression rods are disclosed, for example, in United States Patent Application Publication No. US 2008/0135468 A1 entitled Filtration Assemblies and Methods of Installing Filtration Units in Filtration Assemblies and in United States Patent Application Publication No. US 2008/0135499 A1 entitled Filtration Assemblies and Methods of Maintaining Compression of Filtration Units in Filtration Assemblies. Alternatively or additionally, the fluid treatment assembly may be compressively held within a mechanical and/or hydraulic holder or press. Seals, including, for example, gaskets, may be arranged between adjacent fluid treatment units and/or between a fluid treatment unit and the manifold or an end piece to seal these components to one another.

The flow restrictor may be positioned at any of a variety of locations in the retentate passage. For example, the flow restrictor 26 may be positioned in the retentate passage 25 in the manifold 30 between the retentate opening 35 in the manifold body 31 and the retentate outlet 24. Further, the flow restrictor may be configured in any of numerous ways to increase the back pressure or the resistance to fluid flow in the retentate passage. For example, the flow restrictor may be configured as any type of structure that increases the resistance to retentate flow in the retentate passage, including one or more restrictive flow orifices arranged serially and/or in parallel or one or more restrictive flow channels or capillaries arranged serially and/or in parallel in the retentate passage 25. In the embodiment of FIG. 2, the flow restrictor 26 may be configured as a small-opening restrictive channel 40 that forms a portion of the retentate passage 25 in the manifold 30. The restrictive channel 40 may be straight, bent, or curved. The small-opening restrictive channel 40 may be formed, for example, as a small, elongated bore within the manifold body 31 or as a small, elongated groove, e.g., a V-shaped, U-shaped, or semicircular groove, in a surface, e.g., the mounting surface 32, of the manifold body 31. The groove may be sealed at the surface of the manifold body 31 in a variety of ways. For example, a thin impermeable sheet, e.g., a thermoplastic or thermoset sheet, may be bonded to the surface of the manifold body over the groove to enclose the groove. Alternatively, a fluid treatment unit may be pressed against or bonded to the mounting surface to enclose the groove.

The dimensions of the flow restrictor may be selected in accordance with the desired concentration factor or volume reduction and may depend on factors including fluid parameters, e.g., fluid viscosity and solids content, and operating parameters, e.g., system feed pressure and feed flow rate. As the size of the restrictive opening in the flow restrictor decreases and/or the length of the restrictive channels in the flow restrictor increases, the back pressure or the resistance to flow within the retentate passage may increase. As resistance to fluid flow within the retentate passage increases, the pressure at the feed side of the permeable media of the fluid treatment units may also increase, enhancing the concentration factor and volume reduction. Generally, the resistance of the flow restrictor may be selected, e.g., the restrictive openings may be made small enough and/or the length of the restrictive channels may be made large enough, to enhance the concentration factor and volume reduction while maintaining desired retentate flow rates. These dimensions may be determined empirically for any set of fluid parameters and operating parameters. For many embodiments, the area of the small opening restrictive flow channel 40 may be in the range from about $10^{-7}$ square inch (64.5 square microns) or less to about $10^{-2}$ square inch (6.45 square mm) or more, e.g., about $10^{-6}$ square inch (645 square microns) or about 0.001 inch (25.4 microns) by about 0.001 inch (25.4 microns) to about $5 \times 10^{-3}$ square inch (3.2 square mm) or about 0.07 inch (1.8 mm) by 0.07 inch (1.8 mm). The length of the restrictive flow channel 40 may be in the range from about 0.5 inch (1.27 cm) or less to about 4 inches (10.2 cm) or more, e.g., about 1 inch (2.54 cm) to about 3 inch (7.62 cm). For many embodiments, the flow restrictor may have a hydraulic radius in the range from about 0.32 thousandths of an inch (8.1 microns) or less to about 0.1 inch (2.5 mm) or more, e.g., in the range from about one thousandths of an inch (0.025 mm) to about 70 thousandths of an inch (1.8 mm).

In operation, a feed fluid may be supplied under pressure from a fluid system (not shown) to the feed inlet 20 of the fluid treatment assembly 10 shown in FIG. 1, where the feed fluid may pass through the feed passage 21 to the feed side 15 of the permeable fluid treatment medium 14 of each cross flow fluid treatment unit 13. For example, the feed fluid may enter the feed inlet 20 of the manifold 30 under pressure. The feed pressure may vary from one fluid system and fluid treatment assembly to another. For some embodiments, the feed pressure may be in the range from about 20 psi or less to about 80 psi or more, e.g., between 40 psi and 70 psi. The feed fluid may pass from the feed inlet 20 along the feed passage 21 through the feed opening 33 in the mounting surface 32 on each side of the manifold 30 into the fluid treatment units 13. The feed fluid may continue through the feed passage 21 in the fluid treatment units 13 and tangentially along the feed side 15 of the permeable medium 14 in the fluid treatment units 13 on each side of the manifold 30. A portion of the feed fluid may then pass as permeate from the feed side 15 through the permeable medium 14 to the permeate side 16, as shown by the arrows in FIG. 1.

The permeate may be directed from the permeate side 16 of the permeable medium 14 through the permeate passage 23 to the permeate outlet 22. For example, the permeate may pass through the permeate passage 23 along the permeate side 16 of the permeable medium 14 of each fluid treatment unit 13 to the permeate opening 34 in the mounting surface 32 on each side of the manifold 30. The permeate may then enter the manifold 30 via the permeate openings 34 and pass through the permeate passage 23 to the permeate outlet 22 on the manifold 30, where the permeate is received by the fluid system.

The portion of the feed fluid that does not pass through the permeable medium of a fluid treatment unit, i.e., the retentate, may pass from the feed side 15 of each permeable medium 14 through the retentate passage 25 and the flow restrictor 26 in the retentate passage 25. The flow restrictor 26 increases the back pressure in the retentate passage 25 which may increase the pressure at the feed side 15 of each permeable medium 14. From the flow restrictor 26, the retentate may pass to the retentate outlet 24. For example, the retentate may pass through the retentate passage 25 from the feed side 15 of the permeable medium of each fluid treatment unit 13 to the retentate opening 35 in the mounting surface 32 on each side of the manifold 30. The retentate may then enter the manifold 30 via the retentate openings 35 and pass through the flow restrictor 26 in the manifold 30. For example, the retentate may pass through the small-opening restrictive flow channel 40 shown in FIG. 2. The flow restrictor 26, e.g., the restrictive flow channel 40, increases the back pressure in the retentate passage 25 which may increase the feed pressure at the feed side of the permeable medium 14 in each fluid treatment unit 13 on each side of the manifold. The pressure drop across the flow restrictor 26 may be in the range from about 5 psi or less to about 30 psi or more. The pressure at the feed side of the permeable media may vary from one fluid treatment assembly to another and from one fluid treatment unit to another within a single fluid treatment assembly. From the flow restrictor 26, e.g., the restrictive flow channel 40, the retentate passes along the retentate passage 25 to the retentate outlet 24.

Many advantages are associated with the fluid treatment assemblies, manifolds, and methods that embody the invention. For example, by providing a flow restrictor in the retentate passage that increases the back pressure in the retentate passage, a larger portion of the feed fluid may be forced from the feed side through the permeable medium as permeate. If the permeate is the desired product, a larger volume of the desired permeate is available at the permeate outlet. If the retentate is the desired product, the larger volume of permeate forced through the permeable medium eliminates more of the less desired permeate and further concentrates the more desired retentate available at the retentate outlet. Further, the flow restrictor may maintain the pressure in the retentate passage near the retentate outlet above 0 psi, thereby ensuring an adequate feed flow to all of the fluid treatment media and providing a more robust fluid treatment assembly. For many embodiments, the flow restrictor may also keep the concentration factor somewhat constant with varying feed pressure or somewhat constant over time at any single feed pressure. In addition, fluid treatment assemblies and methods embodying the invention are easy to install and use in a fluid system. Because the fluid treatment assembly includes a flow restrictor in the retentate passage, the fluid system may include less exterior valving that needs to be connected to the retentate outlet and adjusted to control retentate flow from the retentate outlet. The fluid treatment assembly may instead be quickly and easily installed and used by simply connecting the feed inlet and permeate and retentate outlets of the fluid treatment assembly to the appropriate parts of the fluid system and supplying feed fluid under pressure to the feed inlet of the fluid treatment assembly.

While various features of the invention have been described and/or illustrated with respect to several embodiments, the invention is not limited to these embodiments. For instance, one or more features of these embodiments may be eliminated or modified or one or more features of one embodiment may be combined with one or more features of another embodiment, without departing from the scope of the invention. Even embodiments with very different features may be within the scope of the invention.

For instance, the fluid treatment assembly may be modified to include two or more retentate outlets and each retentate outlet may be associated with a different flow resistance in the retentate passage. The manifold 30 shown in FIG. 3 is analogous to the manifold 30 shown in FIG. 2. (Similar components have similar reference numerals in both drawings.) However, the manifold 30 shown in FIG. 3 may include one retentate outlet 24A associated with a higher flow resistance in the retentate passage 25 and another retentate outlet 24B associated with a lower flow resistance in the retentate passage 25. The retentate outlet 24A associated with the higher flow resistance is also associated with a larger increase in back pressure in the retentate passage 25 than the retentate outlet 24B associated with the lower resistance. Each retentate outlet 24A, 24B may fluidly communicate with the flow restrictor 26, and the flow restrictor 26 may be configured in a variety of ways to provide the different flow resistances in the retentate passage 25. For example, the flow restrictor 26 may include two small-opening restrictive flow channels 40A, 40B that extend in parallel. In the illustrated embodiment, both restrictive flow channels 40A, 40B may extend in parallel away from the retentate opening 35 in the manifold 30. One restrictive flow channel 40A may provide a higher resistance to retentate flow than the other restrictive flow channel 40B, for example, by being longer and/or having a smaller opening than the other restrictive flow channel 40B. The higher resistance retentate outlet 24A may fluidly communicate with the higher resistance restrictive flow channel 40A, while the lower resistance retentate outlet 24B may fluidly communicate with the lower resistance flow channel 40B. In other embodiments, the flow restrictor may be a single small-opening restrictive flow channel, and the higher resistance retentate outlet may fluidly communicate with the end of the restrictive flow channel, while the lower resistance retentate outlet may fluidly communicate with the restrictive flow channel between the ends, e.g., in the middle, of the channel.

In operation, a fluid treatment assembly 10 having different retentate outlets 24A, 24B associated with different flow resistances, for example, as shown in FIG. 3, may function in much the same way as a fluid treatment assembly 10 have only one retentate outlet 24 associated with only one flow resistance, e.g., as shown in FIG. 1. The fluid treatment assembly 10 may be installed in the fluid system with the feed inlet 20, the permeate outlet 22, and one of the retentate outlets 24A, 24B connected to the appropriate ports of the fluid system. One of the higher resistance retentate outlet 24A and the lower resistance retentate outlet 24B may be coupled to the fluid system, while the other may be closed off. Feed fluid may be supplied under pressure from the fluid system, and the fluid treatment assembly may operate as previously described. Retentate flowing along the retentate passage 25 and entering the retentate opening 35 in the manifold 30 may continue flowing through the retentate passage 25 to the selected retentate outlet 24A, 24B via the associated restrictive flow channel 40A, 40B. The back pressure in the retentate passage may be increased more if the higher resistance retentate outlet 24A is selected or increased less if the lower resistance retentate outlet 24B is selected.

In another example of a modification, the fluid treatment assembly may include at least one retentate outlet fluidly coupled to the flow restrictor in the retentate passage and another retentate outlet which is fluidly coupled to the retentate passage and bypasses the flow restrictor. For example, the manifold 30 shown in FIG. 3 may include yet another retentate outlet 24C that fluidly communicates with the retentate passage 25 in the manifold 30 and bypasses the flow restrictor 26, e.g., bypasses the restrictive flow channels 40A, 40B. In the illustrated embodiment, the bypass retentate outlet 24C may fluidly communicate directly with the retentate opening 35 in the manifold 30. When the fluid treatment assembly 10 is treating the feed fluid, the feed inlet 20, the permeate outlet 22, and either a retentate outlet 24A, 24B coupled to the flow restrictor 26 or, if desired, the retentate outlet 24C which bypasses the flow restrictor 26 may be connected to the fluid system. When the fluid treatment assembly is being cleaned, a flushing fluid may be supplied to the feed inlet 20 and discharged through bypass retentate outlet 24C to more effectively flush the retentate, feed, and permeate passages 25, 21, 23, as well as the permeable media 14, without the pressure drop associated with the flow restrictor 26.

In another modification, the flow restrictor may be configured as a restrictor layer on the body of the manifold. For example, the manifold 30 shown in FIG. 4 may include a restrictor layer 41 attached to a surface, e.g., on opposite surfaces, of the body 31 of the manifold 30. The restrictor layer 41 may include one or more sublayers 41A-41D that define the flow restrictor 26. For example, the flow restrictor 26 may be configured as a small-opening restrictive flow channel 40 similar to the restrictive flow channels 40, 40A, 40B previously described. The restrictive flow channel 40 in the embodiment shown in FIG. 4 may have a serpentine shape. Each sublayer 41A-41D may, for example, comprise a thin, polymeric sheet, e.g., a thermoplastic or thermoset sheet, and the sublayers 41A-41D may be bonded, e.g., heat bonded, adhesively bonded or chemically/solvent bonded, to one another and the surface of the manifold body 31.

Each sublayer 41A-41D may have a feature formed in the sublayer 41A-41D, and the features taken together may define the flow restrictor 26. For example, the outermost layer 41D may include a relatively large opening 42 corresponding to the retentate opening in the manifold body 31. The next sublayer 41C may include a first portion of the small-opening restrictive flow channel 40, one end of which may fluidly communicate with the large opening 42 in the outermost sublayer 41D. The next sublayer 41B may include a small opening 43 that fluidly communicates with the other end of the first portion of the restrictive flow channel 40. The innermost sublayer 41A may include a second portion of the restrictive flow channel 40 that extends from the small opening 43 to the retentate opening 35 in the body 31 of the manifold 30. The retentate opening 35, in turn, fluidly communicates with the retentate outlet 24. The retentate passage 25 in the manifold 30 shown in FIG. 4 thus extends through the flow restrictor 26, e.g., the restrictive flow channel 40, in each restrictor layer 41 and the retentate opening 35 to the retentate outlet 24. Each restrictor layer in the region of the feed and permeate openings in the manifold (not shown in FIG. 4) may have relatively large, aligned openings in all of the sublayers, allowing the feed and permeate passages to extend from the fluid treatment units through the restrictor layer and the remainder of the manifold to the feed inlet and the permeate outlet.

In operation, a fluid treatment assembly 10 which includes a restrictor layer 41, for example, a restrictor layer 41 on each side of the manifold body 31 as shown in FIG. 4, may function in much the same way as the fluid treatment assembly 10 shown in FIG. 1, as previously described. However, the retentate may pass along the retentate passage 25 through the flow restrictor 26, e.g., the restrictive flow channel 40 in the restrictor layer 41 of the manifold 30, to the retentate outlet 24. The resistance to retentate flow and the associated increase in the back pressure in the retentate passage 25 may be provided by the flow restrictor 26, e.g., the restrictive flow channel 40, in the restrictor layer 41 on each side of the manifold body 31.

Figure 5:
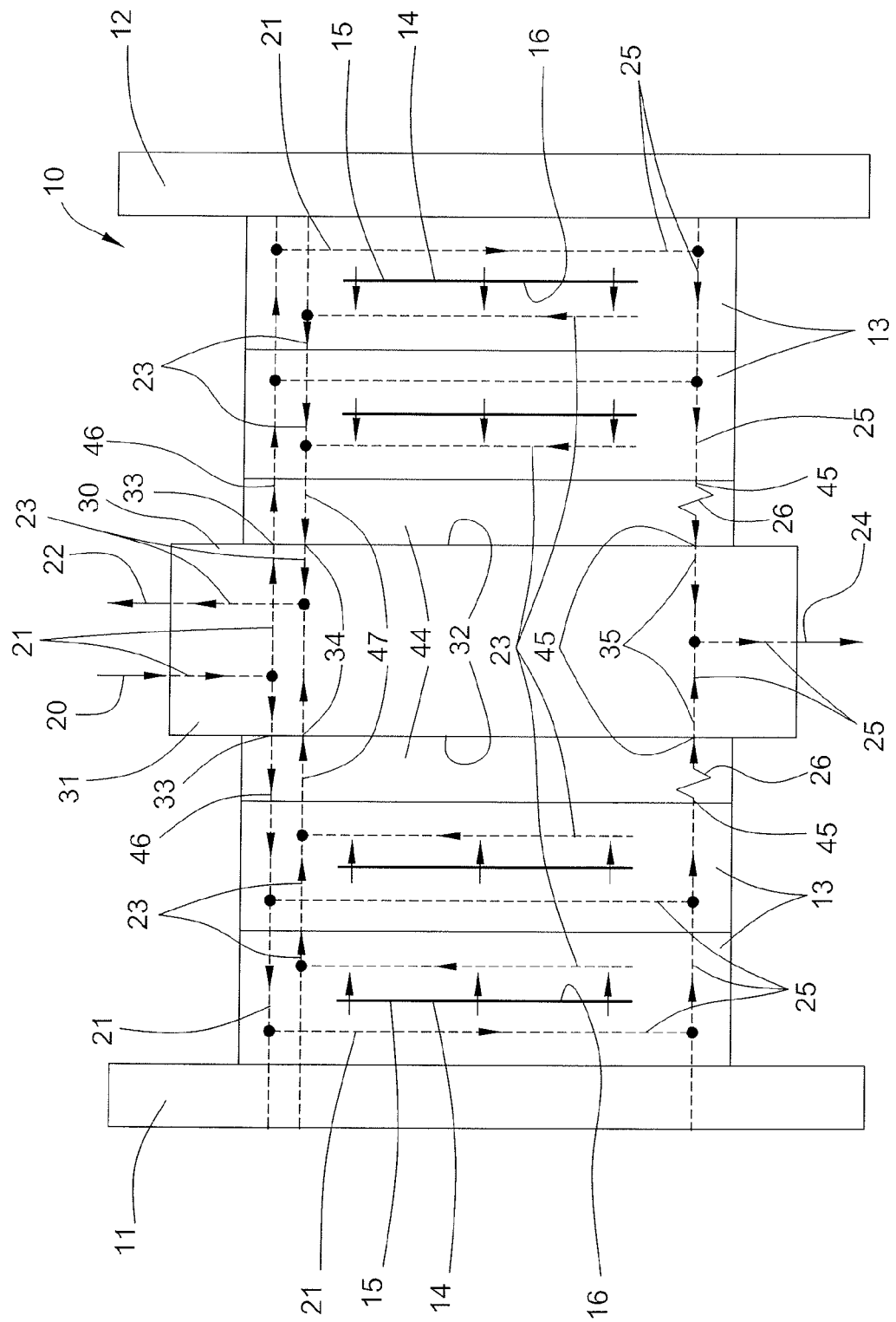
FIG. 5 is a representative view of another fluid treatment assembly.

Another embodiment of a fluid treatment assembly 10 is shown in FIG. 5, and it is similar to the fluid treatment assembly 10 shown in FIG. 1. (Similar components are identified by similar reference numerals in both drawings.) However, the multilayer structure of the fluid treatment assembly 10 shown in FIG. 5 may include a restrictor piece, for example, a restrictor plate 44, between the end pieces 11, 12 and adjacent to the manifold 30, e.g., between the fluid treatment units 13 and the mounting surface 32 on each side of the manifold 30. The flow restrictor 26 may be located in the retentate passage 25 in the restrictor piece 44 and not in the manifold 30. The flow restrictor 26 in the restrictor piece 44 may be configured in any of numerous ways, including any of the configurations of the flow restrictor 26 previously described with respect to the manifold 30. For example, as shown in FIG. 6, the restrictor piece 44 may include a relatively large, truncated retentate opening 45 on each side of the piece 44 and a small-opening restrictive flow channel 40 similar to those previously described extending between the retentate openings 45. The retentate passage 25 extends from the fluid treatment units 13 to the manifold 30 through the flow restrictor 26 in the restrictor piece 44, e.g., through the retentate openings 45 and the restrictive flow channel 40 in the restrictor piece 44. The feed and permeate passages 21, 23 may extend straight through the restrictor piece 44 via feed and permeate openings 46, 47 in the form of through bores.

In operation, the fluid treatment assembly 10 shown in FIG. 5 may function in much the same way as the fluid treatment assembly 10 shown in FIG. 1, as previously described. However, the feed fluid and the permeate may pass along the feed passage 21 and the permeate passage 23 through the feed opening 46 and the permeate opening 47, respectively, in the restrictor piece 44 between the manifold 30 and the fluid treatment units 13. The retentate passes along the retentate passage 25 through the retentate openings 45 and the flow restrictor 26, e.g., the restrictive flow channel 40, in the restrictor piece 44 between the fluid treatment units 13 and the manifold 30. In the manifold 30, the retentate may pass along the retentate passage 25 through the retentate opening 35 to the retentate outlet 24 without passing through any flow restrictor. The resistance to retentate flow and the associated increase in the back pressure in the retentate passage 25 may be provided by the flow restrictor 26, e.g., the restrictive flow channel 40, in the retentate passage 25 in the restrictor piece 44 on each side of the manifold body 31.

Another embodiment of a fluid treatment assembly 10 is shown in FIG. 7, and it is similar to the fluid treatment assembly 10 shown in FIG. 1. (Similar components are identified by similar reference numerals in each drawing.) However, the flow restrictor may be positioned in the retentate passage in one or more fluid treatment units and not in the manifold. For example, in the embodiment shown in FIG. 7, the flow restrictor 26 may be positioned in the retentate passage 25 in the fluid treatment unit(s) 13 adjacent to the manifold 30 and not in the manifold 30. The flow restrictor 26 in the fluid treatment unit 13 may be configured in any of numerous ways, including any of the configurations of the flow restrictor 26 previously described with respect to the restrictor piece 44 or the manifold 30. In operation, the fluid treatment assembly 10 shown in FIG. 7 may function in much the same way as the fluid treatment assembly 10 shown in FIG. 1, as previously described. However, the retentate passes along the retentate passage 25 through the flow restrictor 26 in the fluid treatment unit 13, e.g., the fluid treatment unit 13 adjacent to the manifold 30. In the manifold 30, the retentate may pass along the retentate passage 25 through the retentate opening 35 to the retentate outlet 24 without passing through any flow restrictor. The resistance to the retentate flow and the associated increase in back pressure in the retentate passage 25 may be provided by the flow restrictor 26 in the retentate passage in the fluid treatment unit 13 on each side of the manifold body 31.

Another embodiment of a fluid treatment assembly 10 is shown in FIG. 8 and it is similar to the fluid treatment assembly 10 shown in FIG. 1. (Similar components are identified by similar reference numerals in both drawings.) However, the fluid treatment assembly 10 shown in FIG. 8 may have only one fluid treatment assembly 13 positioned between the end pieces 11, 12, although a plurality of fluid treatment units may be provided. Further, at least one of the end pieces 11, 12 may be a manifold 30. A manifold that serves as an end piece may be configured in a manner virtually identical to any of the manifolds 30 previously described. However, the manifold 30 may have a mounting surface 32 on only one side of the manifold 30, and the fluid treatment units 13 may be positioned on only one side of the manifold 30. In the embodiment shown in FIG. 8, the manifold 30 may be very similar to the manifold 30 shown in FIG. 1, each manifold 30 including a retentate opening 35, a retentate outlet 24 and a flow restrictor 26 in the retentate passage 25 in the manifold 30. The flow restrictor 26 in the manifold 30 may be configured in any of numerous ways, including any of the configurations previously described. In operation, the fluid treatment assembly 10 shown in FIG. 8 may function in much the same way as the fluid treatment assembly 10 of FIG. 1 as previously described. However, the feed, permeate, and flow passages 21, 23, 25 may extend through the manifold 30 to the fluid treatment unit(s) 13 on only one side of the manifold 30. In particular, the retentate passes along the retentate passage 25 through the flow restrictor 26 in the manifold 30 to the retentate outlet 24. The resistance to retentate flow and the associated increase in back pressure in the retentate passage 25 may be provided by the flow restrictor 26 in the retentate passage 25 in the manifold 30 which serves as an end piece 12.

Another embodiment of a fluid treatment assembly 10 is shown in FIG. 9, and it is similar to the fluid treatment assemblies 10 shown in FIGS. 1, 5, and 8. (Similar components are identified by similar reference numerals in the drawings.) The fluid treatment assembly 10 shown in FIG. 9 may include a restrictor piece 44 having a flow restrictor 26 similar to the restrictor piece 44 and the flow restrictor 26 shown in FIG. 5. Further, both of the end pieces 11, 12 may be manifolds 30A, 30B and neither manifold 30A, 30B may include a flow restrictor. One of the manifolds 30A may include the feed inlet 20 and the feed passage 21 as well as the permeate outlet 22 and the permeate passage 23, while the other manifold 30B may include the retentate outlet 24 and the retentate passage 25. In operation, the fluid treatment assembly 10 shown in FIG. 9 functions in much the same way as the fluid treatment assemblies 10 shown in FIGS. 1, 5, and 8. However, feed fluid is supplied to the fluid treatment unit(s) 13 and permeate is received from the fluid treatment unit(s) 13 only by one of the manifolds 30A, while retentate is received from the fluid treatment unit(s) 13 only by the other manifold 30B. The retentate passes along the retentate passage 25 through the flow restrictor 26 in the restrictor piece 44 to the manifold 30B having the retentate outlet 24. The resistance to retentate flow and the associated increase in back pressure in the retentate passage 25 is provided by the flow restrictor 26 in the restrictor piece 44.

Another embodiment of a fluid treatment assembly 10 is shown in FIG. 10, and it is similar to the fluid treatment assemblies 10 shown in FIGS. 1, 7, and 8. (Similar components are identified by similar reference numerals.) The fluid treatment assembly 10 shown in FIG. 10 may include a fluid treatment unit 13 having a flow restrictor 26 similar to the fluid treatment unit 13 and the flow restrictor 26 shown in FIG. 7. The retentate passes along the retentate passage 25 through the flow restrictor 26 in the fluid treatment unit 13 to the manifold 30 and the retentate outlet 24. The resistance to retentate flow and the associated increase in back pressure in the retentate passage 25 may be provided by the flow restrictor 26 in the fluid treatment unit 13.

Further modifications and variations may become apparent to those of ordinary skill in the art upon reviewing the foregoing description and the attached drawings. For many embodiments, the flow restrictor may be positioned in the retentate passage near the end of the retentate passage and upstream of the retentate outlet. For example, the flow restrictor may be positioned in the last filtration unit in the retentate passage, as shown, for example, in FIGS. 7 and 10. Or the flow restrictor may be positioned in the retentate passage downstream from the last filtration unit, e.g., in a restrictor piece, as shown, for example, in FIGS. 5 and 9, or in the manifold, as shown, for example, in FIGS. 1 and 8. However, the flow restrictor may also be configured as part of the retentate outlet. For example, the retentate outlet may comprise a mechanism that functions as a flow restrictor. The mechanism may have a fixed or adjustable opening which increases the back pressure in the retentate passage that extends through the retentate outlet. Accordingly, the invention includes all variations, modifications, and equivalents of the subject matter recited in the following claims as permitted by applicable law.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A manifold for a fluid treatment assembly having at least one cross flow fluid treatment unit, the manifold comprising a body having an mounting surface on at least one side facing the at least one cross flow fluid treatment unit and a retentate opening in the mounting surface for receiving retentate from the at least one cross flow fluid treatment unit, a retentate outlet on the body, a retentate passage extending through the body from the retentate opening to the retentate outlet, and a flow restrictor positioned in the retentate passage between the retentate opening and the retentate outlet of the body, the flow restrictor being configured to increase the resistance to retentate flow through the retentate passage.

2. The manifold of claim 1 wherein the body has a feed opening for supplying feed fluid to the at least one cross flow fluid treatment unit and wherein the manifold further comprises a feed inlet on the body and a feed passage extending through the body from the feed inlet to the feed opening.

3. The manifold of claim 1 wherein the body has a permeate opening for receiving permeate from a fluid treatment unit and wherein the manifold further comprises a permeate outlet on the body and a permeate passage extending through the body from the permeate opening to the permeate outlet.

4. The manifold of claim 1 wherein the flow restrictor includes a restrictive flow channel in the retentate passage in the body.

5. The manifold of claim 1 wherein the body further includes a restrictor layer attached to a surface of the body, the restrictor layer forming the flow restrictor and the retentate passage extending through the flow restrictor in the restrictor layer to the retentate opening of the body.

6. The manifold of claim 5 wherein the restrictor layer includes one or more sublayers forming the flow restrictor, the flow restrictor comprising a restrictive flow channel.

7. The manifold of claim 1 wherein the retentate outlet comprises a first retentate outlet and the manifold further comprises a second retentate outlet, wherein the flow restrictor comprises a first restrictive flow channel and a second restrictive flow channel, and wherein the first retentate outlet fluidly communicates with the first restrictive flow channel in a first location that provides a first flow resistance and the second retentate outlet fluidly communicates with the second restrictive flow channel in a second location that provides second flow resistance which is less than the first flow resistance.

8. The manifold of any of claim 1 wherein the retentate outlet comprises a first retentate outlet fluidly communicating with the flow restrictor and wherein the manifold further comprises a second retentate outlet, the second retentate outlet fluidly communicating with the retentate passage and bypassing the flow restrictor.

* * * * *